United States Patent
Abel et al.

(10) Patent No.: US 6,715,601 B2
(45) Date of Patent: Apr. 6, 2004

(54) METHOD FOR CONTROL OF THE CHAIN DRIVE MECHANISMS OF UNDERGROUND WORKING MACHINES, ESPECIALLY CHAIN SCRAPER CONVEYORS, AND A CHAIN SCRAPER CONVEYOR

(75) Inventors: Dirk Abel, Aachen (DE); Arno Breimhorst, Hagen (DE); Erwin Haese, Bochum (DE); Gerhard Merten, Lünen (DE); Peter Herkenrath, Bottrop (DE); Nicole Kostiza, Aachen (DE); Manfred Ziegler, Erftstadt (DE); Ulrich Paschedag, Ascheberg-Herbern (DE)

(73) Assignee: DBT Automation GmbH (DE)

( * ) Notice: Subject to any disclaimer, the term of this patent is extended or adjusted under 35 U.S.C. 154(b) by 0 days.

(21) Appl. No.: 10/152,604

(22) Filed: May 21, 2002

(65) Prior Publication Data

US 2002/0195318 A1 Dec. 26, 2002

(30) Foreign Application Priority Data

May 21, 2001 (DE) .......................... 101 24 948

(51) Int. Cl.$^7$ .............................................. B65G 43/00
(52) U.S. Cl. .................. 198/810.01; 198/834; 198/718; 198/719
(58) Field of Search ............................ 198/810.01, 718, 198/834, 719

(56) References Cited

U.S. PATENT DOCUMENTS

| | | | | | |
|---|---|---|---|---|---|
| 3,589,504 A | * | 6/1971 | Blough | .......................... | 198/232 |
| 3,780,297 A | * | 12/1973 | Geary | ..................... | 250/231 R |
| 3,845,375 A | * | 10/1974 | Stiebel | .......................... | 318/463 |
| 3,930,573 A | * | 1/1976 | Wyman | ........................ | 198/37 |
| 3,942,625 A | * | 3/1976 | Snead | ........................... | 198/37 |
| 3,989,989 A | * | 11/1976 | Mayer | ........................... | 318/72 |
| 4,157,753 A | * | 6/1979 | Garnier | ........................ | 198/856 |
| 4,175,657 A | * | 11/1979 | Dehne et al. | ................ | 198/833 |
| 4,236,604 A | * | 12/1980 | Warner | ........................ | 186/61 |
| 4,356,900 A | * | 11/1982 | Sommer | ..................... | 192/0.02 |
| 4,574,943 A | * | 3/1986 | Green | ........................... | 198/810 |
| 4,579,218 A | * | 4/1986 | Park et al. | ................... | 198/810 |
| 4,715,491 A | * | 12/1987 | Elderton | ...................... | 198/856 |
| 4,765,456 A | * | 8/1988 | Bower | .......................... | 198/810 |
| 5,513,902 A | | 5/1996 | Pago et al. | | |
| 5,765,678 A | * | 6/1998 | Uranaka et al. | ........ | 198/810.01 |
| 5,957,263 A | * | 9/1999 | Espenschied | .......... | 198/349.95 |
| 6,029,798 A | * | 2/2000 | Miller | .................... | 198/810.01 |
| 6,155,401 A | * | 12/2000 | Lunardi et al. | ............. | 198/330 |
| 6,158,576 A | * | 12/2000 | Eagles et al. | .......... | 198/810.01 |
| 6,351,096 B1 | | 2/2002 | Jang | | |

FOREIGN PATENT DOCUMENTS

| | | |
|---|---|---|
| SU | 910508 A1 | 3/1982 |
| SU | 1239050 A1 | 6/1986 |

* cited by examiner

*Primary Examiner*—Christopher P. Ellis
*Assistant Examiner*—Rashmi Sharma
(74) *Attorney, Agent, or Firm*—Cook, Alex, McFarron, Manzo, Cummings & Mehler, Ltd.

(57) ABSTRACT

The invention relates to a method for the control of the chain drive mechanisms of underground working machines and a correspondingly equipped chain scraper conveyor. The invention proposes to filter out a detection signal ($S_{erk}$), representative of the currently arising vibrations of the chain (1), from the operating data of the main and auxiliary drives (I, II) by means of a detection device (34), and to take this to an active suppressor (35), which generates a time-variable control signal ($S_{Tilgung}$) in accordance with a suppressor function, with which, in the frequency range of the vibration of the chain, a change is effected to a control value, e.g. ($S_{soll}$) for the closing pressure adjustment of a multiple disc clutch (6) of at least one drive unit for the suppression of vibration by the abstraction of energy from, or the introduction of energy into the chain (1).

14 Claims, 4 Drawing Sheets

METHOD FOR CONTROL OF THE CHAIN DRIVE MECHANISMS OF UNDERGROUND WORKING MACHINES, ESPECIALLY CHAIN SCRAPER CONVEYORS, AND A CHAIN SCRAPER CONVEYOR

The present invention relates to a method for the control of the chain drive mechanisms of underground working machines, especially chain scraper conveyors, as well as a corresponding chain scraper conveyor.

DE 43 16 798 A1, to whose published content reference is made here, proposes a generic underground chain drive mechanism, which is provided with a multiple disc clutch with hydraulic closing pressure adjustment and a measuring and control device, in order to satisfy the different requirements on modern drive systems with continuously rising installed performance, high reliability and high endurance of all components with a compact construction of the drive system. The drive mechanism for the chain operation of the underground working machine, especially of a face conveyor, comprises two drives, of which one forms the main drive and the other an auxiliary drive and each has a mains fed electrical drive motor, whose drive revolutions and motor torque which can be transmitted to a chain wheel via a two stage gearbox unit, of which at least the second is constructed as a planet drive. The core of each drive unit is a multiple disc clutch, which is assigned to the hollow wheel of the planet drive and detects and adjusts to the various operating conditions and functions, such as smooth starting, overload protection, load equalisation, creeping travel and high starting torque can be controlled. The multiple disc clutch comprises here a fixed clutch packet and a movable clutch packet joined to the hollow wheel, which are pressed together with the coupling pressure prescribed by the control, by means of a hydraulic cylinder controlled by a servo valve. By using a controlled retardation of the hollow wheel, its revolutions and, thereby, the slippage can be adjusted to any desired value between 0 and the maximum revolutions of the hollow wheel. For the control and the regulation of the drive, its operating data are continuously captured, the measured values are evaluated in the evaluation device and regulating values are output from a regulating circuit to the controller of the closing pressure adjustment. The multiple disc clutch is a wet running multiple disc coupling with special clutch linings, so that the power transmission is practically wear-free. The heat arising from slippage between the clutch packets is removed via heat exchangers and a cooling water circuit. The chain wheels of the main drive unit and the auxiliary drive unit drive the circulating chain together, which in face conveyors comprises horizontal and vertical chain elements as well as the scrapers.

In face conveyors with comparatively short chain lengths, i.e. a distance of up to some 350 m, the measuring and evaluation unit, together with the load equalisation, slippage control and overload protection, assures secure operation of the chain scraper conveyor, mostly without failures. With increasing chain lengths, especially in chain scraper conveyors with long chains, i.e. a distance between main and auxiliary drive units of more than 400 m, the problem of chain breakage in the bottom strand, i.e. the empty run of the chain, increases disproportionately. The applicant for the present application has conducted intensive research, to determine the cause of these chain breaks, so that constructional and/or control engineering measures to avoid chain breakages can be undertaken. The latest results from experimental measurements have shown that a chain break in the bottom run often precedes an upwards turning curve of the chain force, so that the cause of the chain break could lie in vibration phenomena of the chain. In this it was shown relatively quickly that transverse vibrations of the chain cold be eliminated as the cause of high dynamic chain forces, so that the investigations were broadened into longitudinal power swings.

Chain breakage in the bottom run presents a real problem, so that it is a main aim of the invention to ameliorate this problem. An attachment to avoid longitudinal swings in the chain by mechanical means, which increase the damping in the chain system, had to be abandoned because of too great a liability to wear, high cost and the greater need for maintenance within the permanently changing chain loading. The applicant of the present application has therefore gone over to reproduce a chain scraper conveyor, together with its drive arrangements and the chain in a model and to research in the model the causes for the vibration phenomena and to simulate measures for their removal.

The main result from this model building and simulation is that vibration phenomena, which finally lead to overloading such as chain breakage or to a shaft break, can be traced back to characteristic chain vibration effects. The chain vibrations depend here strongly on the friction of the chain in the top run and in the bottom run, including the specific characteristics of the friction curve. In the top run a damping is effected by the loading of the pans between the scrapers, which works against the occurrence of characteristic vibrations. In the bottom run on the other hand a substantially greater dependency of the characteristic vibrations on the friction curve is evident, since the characteristic curve of the friction of the chain has a negative gradient and the coefficient of friction reduces with increasing running speed of the chain.

Accordingly taking account of the results discussed above the invention is directed to a method for the control of vibration phenomena in chain driven underground working machines such as conveyor installations or mining extraction machines in which by means of a detection device a detection signal, representative of the current vibration arising in the chain, is filtered out from the operating data of the main and auxiliary drives and taken to an active suppressor, which in dependency on the detection signal, generates a time-variable signal in accordance with a suppression function, with which, in the frequency range of the vibration of the chain, a change is effected in the control value for the closing pressure setting of the multiple disc clutch of at least one, preferably both drive units by the abstraction of energy or the introduction of energy in the chain. For the first time a method is proposed with the present invention, in which information on the current state of vibration in the chain is obtained by means of a detection device and from this using an active suppressor a control signal is generated as a phase shifted exciter, which changes in the same frequency range as the vibration of the chain and by superimposition on the vibration leads to its damping or suppression. The method according to the invention can cost effectively be connected into the presently available regulating structure, integrated in the measuring and control device, since by means of the control signal a change is effected in one of the controlling values in the control structure. Chain drive arrangements with multiple disc clutches with closing pressure adjustment offer here the special advantage that a direct access to the process is possible by their construction and control structure. In drive units with multiple disc clutches it is actually possible to obtain a rapid change in the revolutions of the chain wheel by suitable reduction of the oil pressure in the closing pressure adjuster of the multiple disc clutch. By changing the closing pressure the slippage between the plates is caused to increase, and consequently the hollow wheel accelerates and the drive revolutions of the drive and the chain wheel are reduced. Conversely by increasing the closing pressure the hollow wheel can again be retarded and the chain wheel accelerated. These changes of the control value for the closing pressure setting can be carried out within the frequency range, which is necessary for the active suppression of the vibration. The preferred area of use of the method according to the invention is the suppression of the natural vibrations of the chain; since the method can be used for all the vibration phenomena within the chain driven working machine, the description covers the general case of vibrations.

Various possibilities offer themselves for the adaptation of the method, some preferred examples of which are indicated below. Thus the detection signal can be filtered out electronically from deviations of the measured motor current, motor revolutions, motor torque, drive revolutions, chain force, tensioning cylinder force or closing pressure adjustment using suitable filters and filter structures. It is understood that the sampling rate for filtering out the detection signal must be suitably high and for the calculation of the suppression function and generation of the control signal only short timing cycles are available.

In a preferred embodiment of the method a pulse-like pressure modulation of the closing pressure adjustment is effected by changing the control value in dependency on the control signal. It has been shown that with the pulse like changing of the closing pressure adjustment a rapid and deep acting intervention into the vibration condition of the chain drive can be achieved. In order to suppress the vibration it is then decisive that the first pressure change for introducing energy into the chain or abstracting energy from the chain starts with the correct phase shift related to the vibration and to tune its frequency or periodic duration sharply, so as to achieve an optimum suppression. To achieve this, each pulse cycle of the control signal for pressure modulation of the closing pressure adjustment can comprise at least one starting pulse and one ending pulse with reversed prefixes, whereby the starting pulse has a greater pulse width and lower amplitude than the ending pulse to achieve the abstraction or introduction of energy. The multiple disc clutch can then be adjusted more rapidly to the original control value by the higher and shorter ending pulse. With the pressure modulation a change in the revolutions and/or torque is consequently instigated on one or on both chain wheels, whereby the curve against time of the change is in a tuned ratio to the vibration, phase shifted to it and overlays the vibration, so that from this superimposition suppression of the vibration results. The tuned ratio between the vibration and the opposing vibration generated by pressure modulation can preferably lie at 1, i.e. the opposing vibration has the same frequency as the vibration, or correspond to a whole number multiple, i.e. the suppressing vibration is active only on every n-th. vibration of the chain.

The method can be especially advantageously implemented, if the measuring and evaluation device for each drive unit has a cascade regulation with a pressure control circuit to regulate the closing pressure and a slippage control circuit to regulate the slippage and superimposed on it for both drive units a common power regulator to equalise the load, as is the case with the drive units applied by the applicant (CST-drives). In this the control signal output from the suppressor can then be switched to the output signal or the output signals of the power regulator, so as to tie in the change of the control value or pressure modulation with the desired time relationship in the system. Only with the modified control structure is it possible to detect the vibration in the system, since in the old control circuit structures only the differences between two values are converted, as for instance with the regulator, or the ratios between two values as in the power equalising regulator, as adjusting interventions for the closing pressure adjustment. In the method according to the invention, on the other hand, the detection signal is preferably filtered out from the motor current or the drive revolutions, whilst the slippage is controlled in a pulse-like manner as the control value.

The method according to the invention has at the same time a wider area of application and can also be applied in those underground, chain driven working machines, which have an electric drive motor whose revolutions and torque can be transmitted by a gearbox unit to a chain wheel, and a measuring and regulating device for control, revolutions monitoring, overload protection, load equalisation and the capture of operating data from the main and auxiliary drives, whilst here also a detection signal, representing the current vibration arising is filtered out from the operating data of the main and auxiliary drives by means of a detection device and taken to an active suppressor, which, depending on the detection signal generates a time variable control signal in accordance with a suppressor function, with which a change in the conditions of at least one, preferably both drive units, in the frequency range of the vibration of the chain, is effected for the suppression of vibration by the abstraction of energy from, or the introduction of energy into the chain. The method can consequently also be applied with chain drive mechanisms, which do not have multiple disc clutches, but have electric drive motors in which the revolutions can be changed at will between minimum and maximum without steps. Such drive motors can especially be a drive assembly with frequency converter device, transformer and switching unit, so that the control signal of the suppressor passes via the switching unit to change the revolutions of the chain wheel or the chain wheels.

As set out at the beginning the invention also relates to chain scraper conveyors with the generic construction, which are in which the measuring and control device has a detection device, with which a detection signal representing the currently arising vibration in the chain can be filtered out from the operating data of the main and auxiliary drives, and has an active suppressor to which the detection signal can be taken, which depending on this generates a time-variable control signal in accordance with a suppression function, with which, in the frequency range of the vibration of the chain, a change can be effected to the control values for the closing pressure adjuster of the multiple disc clutch of at least one drive unit for the suppression of vibration in the chain by abstraction of energy or introduction of energy in the chain. As already set out the chain scraper conveyor has preferably a measuring and evaluating device with pressure and slippage control circuits and a power regulator, whereby the control signal output from the suppressor to change the control values is switched to the output signal or the output signals of the power regulator. In scraper chain conveyors it is especially favourable if the multiple disc clutch is wet running and preferably with oil flowing through it and the control value is the slippage, whereby the detection signal from the variations of the drive revolutions or the variations of the motor current is filtered out.

An example of a chain drive mechanism using the method according to the present invention will now be described hereinbelow in relation to the accompanying drawings, in which.

Figure 1:
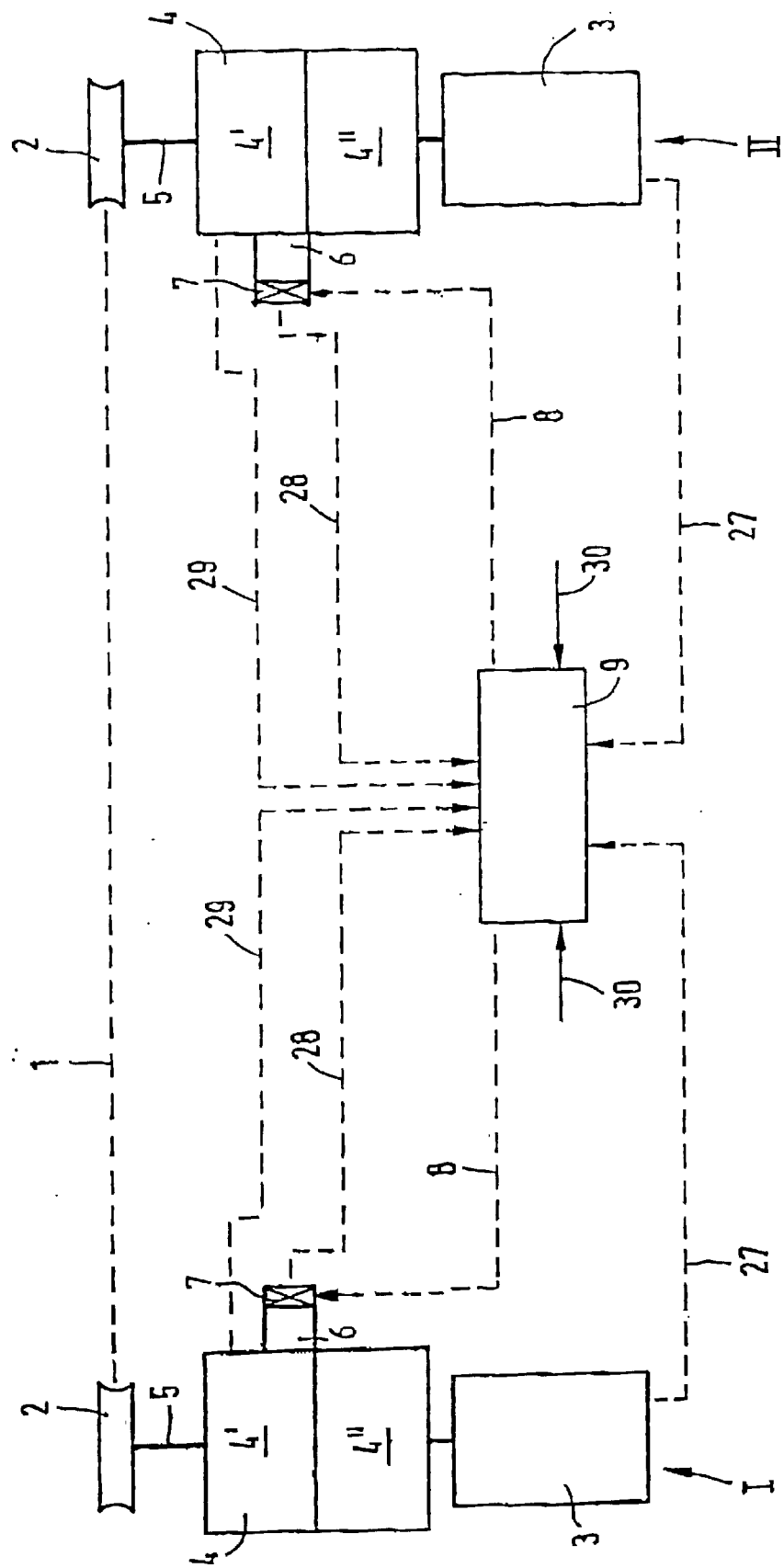
FIG. 1 shows a block circuit diagram of a chain scraper conveyor, in which the vibration suppression according to the invention can be implemented.

FIG. 1 shows a chain drive for a face conveyor (chain scraper conveyor) with an endless, long, circulating chain 1, of which the chain elements and the scrapers are not shown. Chain wheels for the guidance and drive of the chain 1 are designated 2, which can comprise, in customary fashion, chain drums. At both ends of the chain scraper conveyor is provided in each case a drive unit I or II for driving the chain wheels 2 in place there, whereby in the embodiment shown the drive unit I is the main drive and the drive unit II forms the auxiliary drive. The two drive units I and II are constructed similarly in the present embodiment. They each comprise an asynchronous electric motor 3, which drives the associated chain wheel 2 via a gearbox 4, on whose output shaft 5 the chain wheel 2 sits. In the embodiment a drive unit with in each case only one asynchronous motor including its gearbox is described. Within a drive unit, however, two asynchronous motors as well as associated gearboxes can be present, with which the chain or the chain wheel can be driven with correspondingly greater installed power. The gearbox 4 is the CST gearbox used by the Applicant, as is described in detail in DE 43 16 798 A1, which is taken here as a reference, is constructed in two stages with the two drive stages 4', 4", whereby the output drive side drive stage 4' comprises a planet drive, whose hollow wheel, not shown further, is associated with a hydraulically actuated, oil perfused multiple disc clutch 6. The hydraulic closing pressure adjustment, including the pressure application and pressure release of the cylinder space of the multiple disc clutch 6 occurs via an electrical servo-valve 7, which is constructed in a known manner as a quick acting valve and via an electrical control line 8 controlled or switched from an electronic measuring and control device 9. In the embodiment a single control device 9 is shown. In general, however, it is recommended that each drive unit I and II is assigned its own electronic measuring and control device 9, which are connected via a communications link or to a higher level computer.

The asynchronous motors 3 of the drive units I, II permit only small variations in revolutions; with the multiple disc clutches 6, whose moving disc packets are joined to the hollow wheel of the planet drive, it is possible to vary the propulsion or retarding moment on the hollow wheel by changing the closing pressure adjustment and thereby to adjust its revolutions between 0 and the maximum hollow wheel revolutions. The drive revolutions of the planet drive 4' is therefore indirectly dependent on the retarding moment and can thereby be controlled by the closing pressure adjustment. The asynchronous motors 3 themselves run fast with the multiple discs set pressure-free for a smooth start of the drive units I, II, until they have reached their maximum revolutions. The movement of the chain sprocket begins only when the closing pressure in the multiple disc clutches 6 slowly increases and the necessary breakaway torque has been reached. The pressure increase and therewith the motor loading of the drive motors 3 follows a starting strategy during this running up phase. To achieve load equalisation between the drives I, II, the current or energy uptake of each motor 3 is constantly monitored. If deviations greater than a prescribed value occur the slippage on the drive with the higher current consumption is increased until the other drive takes more power and the two drives I,II are again in equilibrium. The control and regulation of the smooth startup, the load equalisation and the overload protection occurs by means of the control device 9, to which, as indicated in FIG. 1, via signal lines 27 for instance operating data such as electrical real power or real current of the asynchronous motors 3 as taken as actual values. The measuring and control device 9 further processes the measured operating data of the components of the drive units I, II fed to it via the signal lines 27, 28, 29 as actual values and at the same time controls the multiple disc clutch 6 via the electrical signal line 8 in accordance with a prescribed control algorithm from a computer program for the momentarily required hydraulic pressure or clutch disc pressure. Measured values and operating data from the drive units I, II are further taken to the measuring and evaluating device 9, via signal lines 30, for instance from torque transducers, from which the drive revolutions of the asynchronous motors 3 are calculated, so as to switch off the asynchronous motors 3 or to open the multiple disc clutch 6 via the control line 8 in the event of overload.

Figure 2:
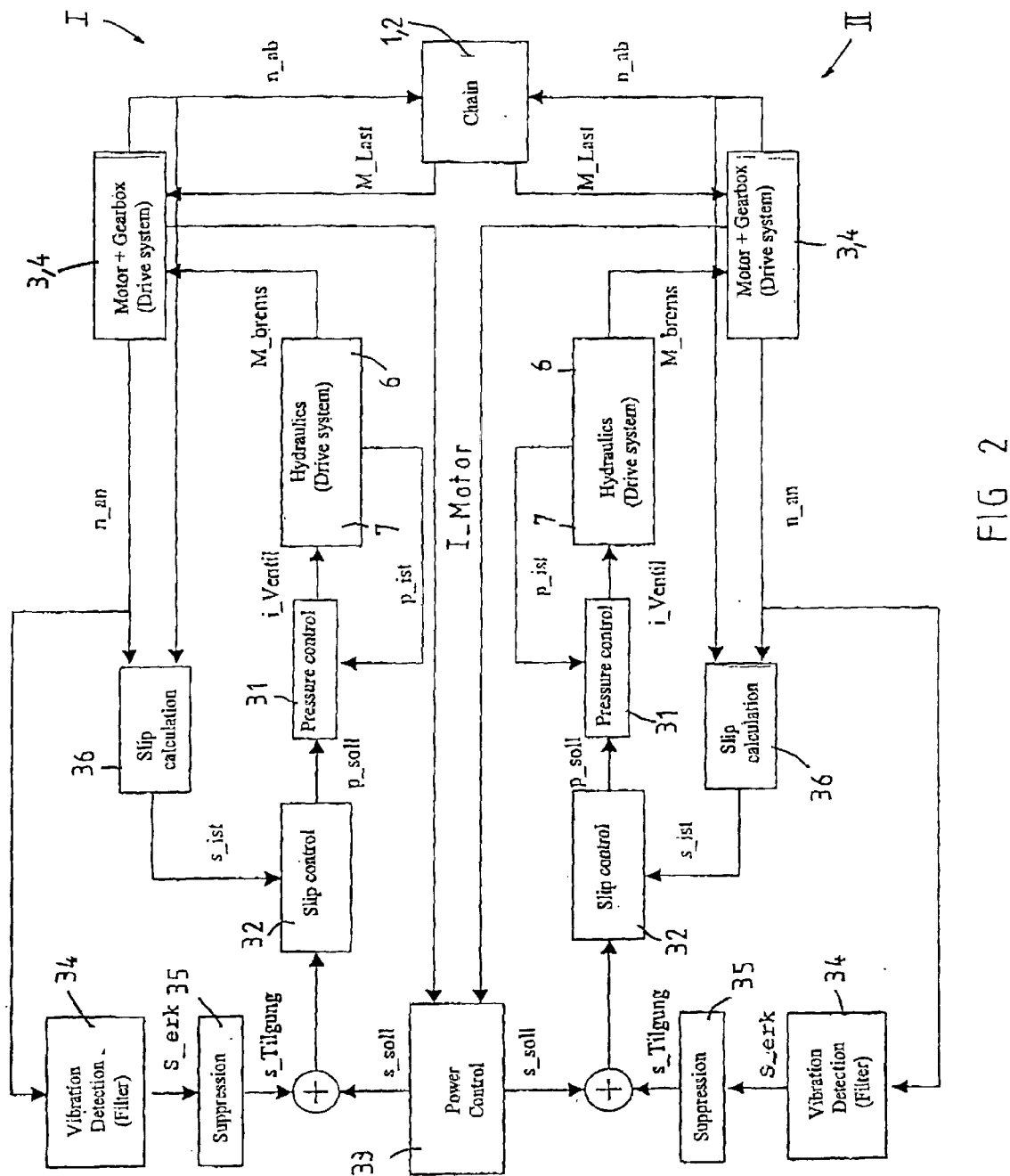
FIG. 2 shows a control circuit structure for the active vibration suppression of the vibrations of the chain in a first embodiment.
Figure 3:
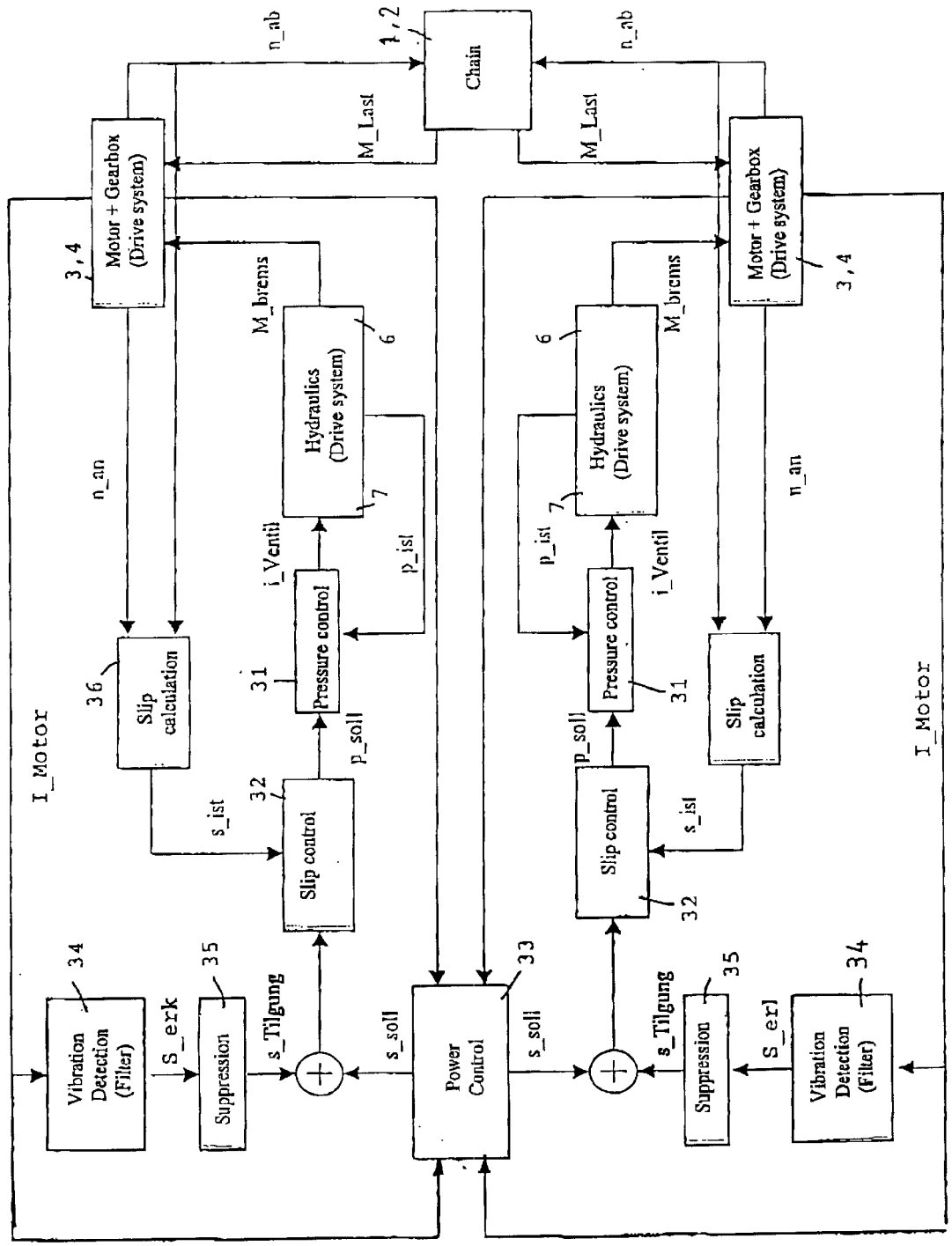
FIG. 3 shows a control circuit structure for the active vibration suppression of the vibrations of the chain in a second embodiment.

The circuit diagrams in FIG. 2 and FIG. 3 show the construction of the control circuit structures previously employed with the drive units I II, albeit supplemented by the vibration suppression provided according to the invention, as later explained. In the upper section is shown the control circuit structure for the main drive I, in the lower section the control circuit structure for the auxiliary drive II. The control circuits for the drives I, II are here constructed the same in themselves and have a cascade structure, which will now be explained. The innermost control circuit is a pressure control circuit associated with each of the two drive units I, II with a pressure regulator 31, which transfers the closing pressure between the disc packets of the multiple disc clutch 6 down to a desired pressure value $p_{soll}$. The pressure regulator 31 used for this has a proportional response and compensates for the non-linearity of the servo valve 7 and the compressibility of the hydraulic fluid dependent on the piston travel. The desired pressure $p_{soll}$ of the pressure regulating circuit is prescribed by an overlaid slippage regulator 32, which controls the difference between the drive revolutions $n_{an}$ and the drive revolutions $n_{ab}$. The desired slippage values $s_{soll}$ of both drives I, II are prescribed by a common power regulator 33 to match each other. The load equalisation hereby causes the desired value of slippage $s_{soll}$ of the momentarily more highly loaded drive to be increased, so as to achieve that the main and auxiliary drives are stationary essentially equally strongly loaded. The motor currents $I_{Motor}$ measured at the motors serve as the measurement value for the power regulator 33.

Without the modification of the known control circuit structure using the detecting device 34 for the currently arising vibration in the chain 1 and the suppressor 35 according to the invention, shown in FIG. 2 and FIG. 3, the desired slippage value $s_{soll}$ output from the power regulator 32 is subtracted only from the calculated actual slippage $S_{ist}$ calculated in the slippage calculator 36 and provided as the desired pressure value $p_{soll}$ to the pressure regulator 31 for an adjusting intervention to the servo valve 7 of the multiple disc clutch 6. This was the cause that using the available control structure even with strong vibration setting up in the system components, this vibration could not be detected, since inter alia the input values forming the difference could vibrate in synchronism with each other.

The modification to the known control circuit structure comprises the detection device 34 for vibrations arising in the chain and the suppressor 35 shown in FIG. 2 and FIG. 3, integrated into the control circuit structure, which depending on the detection signal $S_{erk}$, outputs a control signal which is filtered out by means of the detection device 34 from the operating data of the drive units I, II, for instance from the drive revolutions $n_{an}$ as in the embodiment in FIG. 2 or the motor current $I_{motor}$ as in the embodiment in FIG. 3. In the active suppressor 35 a time variable control signal $S_{Tilgung}$ is generated in accordance with a suppressor function, which is switched to one of the control values, here the desired slippage value $S_{soll}$, in order to excite the closing pressure adjustment of the multiple disc clutch into a position which is in a tuned ratio to the vibration set up in the chain, but is shifted in phase to it, so as to suppress the vibration by the opposing force of the excitation introduced. This excitation and opposing force is achieved by the most rapid changes in the revolutions of the chain wheels 2 by targeted reduction or increase in the pressure in the multiple disc clutch, whereby the changes of pressure, combining reduction and increase effect a pulse-like pressure modulation of the closing pressure adjustment. Each pulse cycle of the pressure modulation and consequently each pulse cycle of the control signal $S_{Tilgung}$ is in a tuned ratio to the periodic duration $T_{Schwingung}$ of the chain vibration, which was suitably filtered out previously using the detection device 34.

Figure 4:
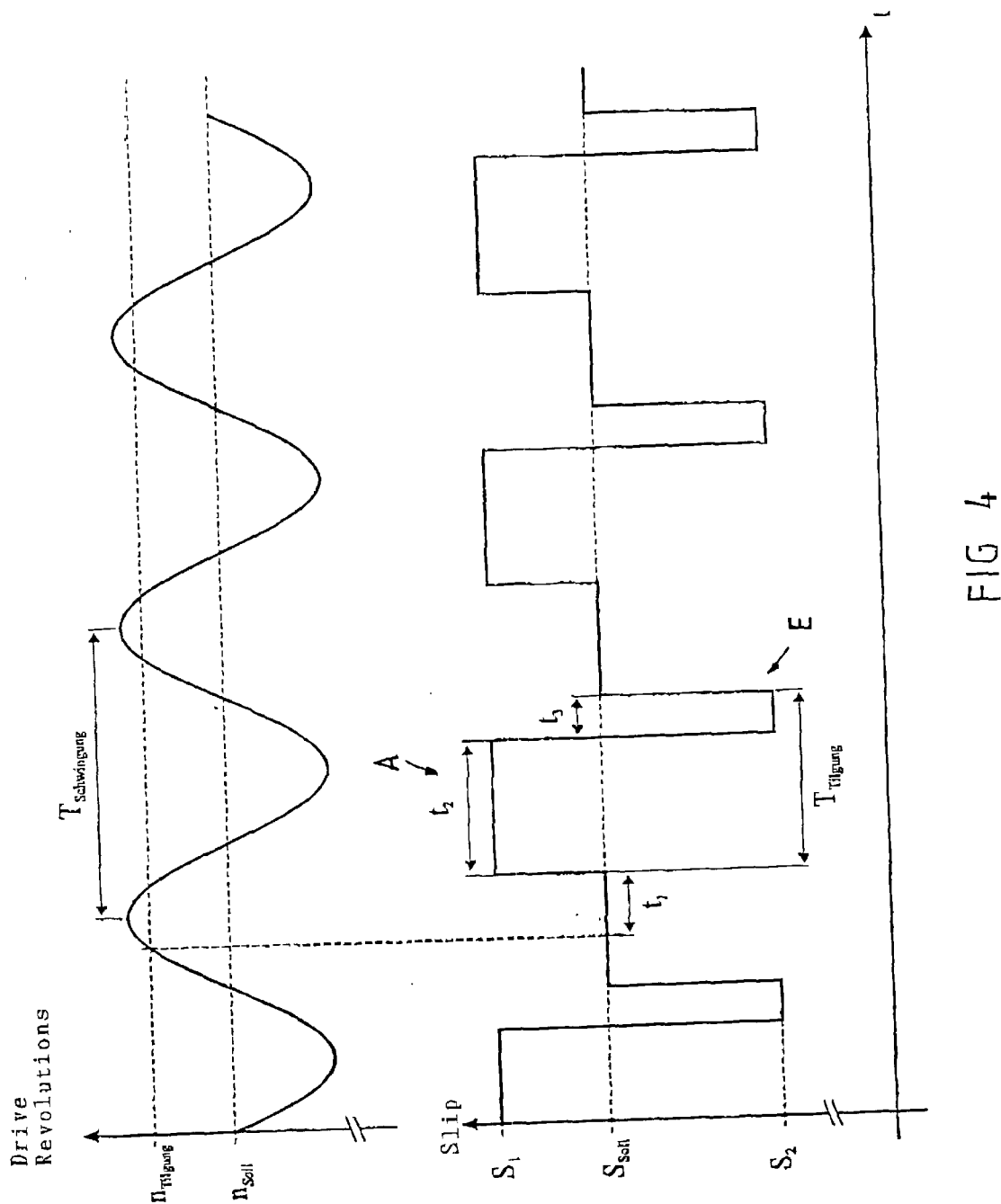
FIG. 4 shows a control signal generated by the suppressor for the slippage control value, shown schematically, with a detection signal filtered out from the revolutions detection signal in an embodiment.

This will now be explained in greater detail with reference to FIG. 4. FIG. 4 explains the principle of the generation of the control signal for vibration suppression in a control circuit structure according to FIG. 2. Without the phenomenon of chain vibration a drive revolutions $n_{an}$ would set up, which in FIG. 4 is idealised as $n_{soll}$ and is shown here as a constant. Owing to the vibration of the chain, the drive revolutions actually fluctuate with the periodic duration of the chain vibration, as is shown in FIG. 4 with a complete wave of the vibration during the periodic duration of $T_{Schwingung}$. The periodic deviation of the revolutions as opposed to the smoothed signal of the drive revolutions $n_{an}$ evaluated for the control of power is filtered out by the detection device 34. If the amplitude of the vibration about the idealised or smoothed value of revolutions $N_{soll}$ does not exceed a prescribed amount, the suppressor 35 does not intervene in the control circuit. If a prescribed amplitude is exceeded, indicated here in FIG. 4 with $n_{Tilgung}$, the suppressor 35 becomes active and starts, in the control circuit structure according to FIG. 2 and FIG. 3, depending on the periodic duration $T_{Schwingung}$ and size of the amplitude of the chain vibration, a control signal, as a change value for the control value $S_{soll}$ which effects pulse-like changes of the closing pressure set up via the pressure regulator 31. In order somewhat to replicate the periodic duration $T_{Schwingung}$ of the natural characteristic vibration, following a delay $t_1$ required by measurement, calculation and inertia, the starting pulse A of the pulse cycle begins, which here is shown with the greater slippage $S_1$ as a constant during the period $t_2$. By a pulse-like increase in the slippage to the value $S_1$ a pulse-like delay of the chain wheel 2 is effected and hereby energy is abstracted from the chain 1. In order then to return the drive revolutions nab of the chain wheel 2 as quickly as possible to the desired value of slippage $S_{soll}$ prescribed by the power regulator, the pulse cycle is ended with an end pulse E, which here is shown with the smaller slippage $S_2$ during the period $t_3$; owing to the greater amplitude deviation of the end pulse E from the desired slippage value $S_{soll}$, the pulse cycle can be adjusted very sharply in time to the reversal of the half wave of the vibration, and a vibration excitation is introduced as a counter force in the chain, which has the periodic duration $T_{Schwingung}$ of the vibration.

Simulations on chain conveyors with a control signal for the active suppression, which have a pulse form corresponding to FIG. 4, have shown that the chain vibrations could be reduced by more than 60%, even with a friction curve with high gradients. The optimisation of the control signal and of the suppressor function are directed decisively at the sampling rate, with which the detection device 34 filters out the detection signal $S_{erk}$, which is representative of the present vibration, from the measured value, for instance the motor current or the drive revolutions. Since the vibrations lie in a frequency range up to some 20 Hz, the pulsed intervention must be generated and effective in the same frequency range. This is readily achievable on the closing pressure adjustment of the multiple disc clutch 6 of the drive units I, II.

What is claimed is:

1. A method for control of chain drive mechanisms of underground working machines, with a long circulating chain, with a main drive unit and an auxiliary drive, each having at least one electric drive motor, whose drive revolutions and torque can be transmitted to a chain wheel via a gearbox unit, which has at least one planet drive associated with its hollow wheel and a multiple disc clutch including a hydraulic closing pressure adjuster as overload protection and with a measuring and control device to capture operating data, to monitor the revolutions and the control of the main and auxiliary drives and to regulate load equalisation of the main and auxiliary drives by, a slippage in the multiple disc clutch, in which by means of a detection device a detection signal, representative of an arising current vibration of the chain is filtered out from the operating data of the main and auxiliary drives and taken to an active suppressor, which depending on the detection signal, generates a time-variable control signal in accordance with a suppressor function, with which, in a frequency range of the vibration of the chain, a change is effected in the control values for the closing pressure setting of the multiple disc clutch of at least one of the drive units for the suppression of vibration by an abstraction of energy or an introduction of energy in the chain.

2. A method according to claim 1, in which the detection signal is filtered out from variations in measured motor current, motor revolutions, motor torque, drive torque, drive revolutions, power in the chain, tensioning cylinder force, or closing pressure adjustment.

3. A method according to claim 1, in which a pulse-like pressure modulation of the closing pressure adjustment is effected by changing the control value dependency on the control signal.

4. A method according to claim 1, in which each pulse cycle of the control signal for the pressure modulation of the closing pressure adjustment preferably comprises at least one starting pulse and one end pulse with reversed prefixes, whereby the starting pulse has a greater pulse width and a lower amplitude than the end pulse to achieve the energy abstraction or introduction.

5. A method according to claim 3, in which a change in the revolutions and/or the torque on one or both chain wheels is instigated by the pressure modulation, whereby a curve against time of a change is in a tuned ratio to the vibration, phase shifted to it and overlays the vibration.

6. A method according to any preceding claim, in which the measuring and evaluation device for each drive unit has a cascade regulation with a pressure control circuit to regulate the closing pressure and a slippage control circuit to regulate the slippage and a common power regulator to equalise the load, whereby the control signal output from the suppressor is switched to an output signal or output signals of a power regulator.

7. A method according to claim 1, in which the detection signal is filtered out from the motor current, or the drive revolutions and is used as the control value for the slippage.

8. A method for control of chain drive mechanisms of underground working machines, with a long circulating chain, with a main drive unit and an auxiliary drive unit, each having at least one electric drive motor, whose drive revolutions and torque can be transmitted to a chain wheel via a gearbox unit and with a measuring and control device to control, monitor revolutions, provide overload protection, load equalisation and capture of operating data from the main and auxiliary drives, in which a detection signal representative of current vibrations arising in the chain is filtered out from the operating data of the main and auxiliary drives by means of the detection device and taken to an active suppressor, which depending on the detection signal, generates a time-variable control signal in accordance with a suppressor function, with which, in a frequency range of the vibration of the chain, a change is effected in conditions of at least one of the drive units for a suppression of vibration by abstraction from or introduction of energy into the chain.

9. A method according to claim 8, in which the drive motor is a drive train with frequency converter unit, transformer and switching unit.

10. A chain scraper conveyor with a main drive unit and an auxiliary drive unit each having an electric drive motor, whose drive revolutions and torque are transmissible to a chain wheel via a gearbox unit, which has at least one planet drive with a multiple disc clutch with a hydraulic closing pressure adjuster associated with its hollow wheel as overload protection, and with a measuring and control device to capture operating data, to monitor the revolutions and to control the main and auxiliary drives and to regulate the load equalising of the main and auxiliary drives via the adjustable slippage in the multiple disc clutch, in which the measuring and control device has a detection device, with which a detection signal representing currently arising vibrations in the chain can be filtered out from the operating data of the main and auxiliary drives, and has an active suppressor to which the detection signal can be taken, which depending on this signal, generates a time-variable control signal in accordance with a suppressor function, with which, in a frequency range of the vibration of the chain, a change can be effected to control values for the closing pressure adjuster of the multiple disc clutch of at least one drive unit for a suppression of vibration in the chain by an abstraction of energy from, or an introduction of energy into the chain.

11. A chain scraper conveyor according to claim 10, in which the measuring and evaluation device for each drive unit has a cascade controller with a pressure control circuit to regulate the closing pressure and a slippage control circuit to regulate the slippage and overlays these for both drive units in a common power controller for load equalisation, whereby a control signal output from the suppressor is switched onto an output signal or output signals of a power regulator to change the control values.

12. A chain scraper conveyor according to claim 10, in which the control value for the slippage and the detection signal is filtered out from variations of the drive revolutions.

13. A chain scraper conveyor according of claim 10, in which the control value for the slippage and the detection signal is filtered out from variations of the motor current.

14. A chain scraper conveyor according to claim 10, in which the multiple disc clutch is wet running and preferably perfused with oil.

* * * * *